(12) United States Patent
Kawasaki (10) Patent No.: US 10,969,291 B1
(45) Date of Patent: Apr. 6, 2021

(54) IONIZATION GAUGE AND CARTRIDGE

(71) Applicant: CANON ANELVA CORPORATION, Kawasaki (JP)

(72) Inventor: Yohsuke Kawasaki, Yamanashi-ken (JP)

(73) Assignee: CANON ANELVA CORPORATION, Kawasaki (JP)

(*) Notice: Subject to any disclaimer, the term of this patent is extended or adjusted under 35 U.S.C. 154(b) by 0 days.

(21) Appl. No.: 17/019,419

(22) Filed: Sep. 14, 2020

Related U.S. Application Data (63) Continuation of application No. PCT/JP2019/036191, filed on Sep. 13, 2019.

(51) Int. Cl.
*G01L 21/34* (2006.01)
*G01L 19/06* (2006.01)
*H01J 41/06* (2006.01)

(52) U.S. Cl.
CPC .............. *G01L 21/34* (2013.01); *G01L 19/06* (2013.01); *H01J 41/06* (2013.01)

(58) Field of Classification Search
CPC ........... G01L 21/34; G01L 19/06; H01J 41/06
USPC .................................................. 324/460, 463
See application file for complete search history.

(56) References Cited

U.S. PATENT DOCUMENTS

| 5,198,772 | A | * | 3/1993 | Peacock | .................. | H01J 41/06 324/463 |
| 6,474,171 | B1 | | 11/2002 | Holme et al. | | |
| 10,222,287 | B2 | | 3/2019 | Kawasaki et al. | | |
| 2018/0259417 | A1 | * | 9/2018 | Kawasaki | ............... | H01J 41/06 |

FOREIGN PATENT DOCUMENTS

| JP | 4836306 B2 | 12/2011 |
| JP | 6177492 B1 | 8/2017 |

OTHER PUBLICATIONS

International Search Report and Written Opinion issued in corresponding International Patent Application No. PCT/JP2019/036191, 7 pages (dated Oct. 8, 2019).

\* cited by examiner

*Primary Examiner* — Nasima Monsur
*Assistant Examiner* — Rahul Maini
(74) *Attorney, Agent, or Firm* — Buchanan Ingersoll & Rooney PC (57) ABSTRACT

An ionization gauge includes an anode, a cathode, and an electromagnetic wave source. The cathode includes a first cathode plate having a through hole through which the anode passes, a storage portion configured to store the electromagnetic wave source, and a passage arranged between the storage portion and the through hole and configured to pass an electromagnetic wave generated by the electromagnetic wave source.

12 Claims, 9 Drawing Sheets

IONIZATION GAUGE AND CARTRIDGE

CROSS-REFERENCE TO RELATED APPLICATION(S)

This application is a continuation of International Patent Application No. PCT/JP2019/036191 filed on Sep. 13, 2019, the entire disclosures of which is incorporated herein by reference.

BACKGROUND OF THE INVENTION

Field of the Invention

The present invention relates to an ionization gauge and a cartridge.

Description of the Related Art

In an ionization gauge, a gas is ionized by applying a voltage between an anode and a cathode and thus causing discharge, and a current flowing between the cathode and the anode is measured to detect a pressure. The ionization gauge can be provided with an inducing unit configured to promote discharge between the anode and the cathode. In Japanese Patent No. 6177492, a cathode is irradiated with an electromagnetic wave, and electrons are emitted from the cathode by the photoelectric effect, thereby inducing discharge. However, in long-time use, substances may be deposited on the surface of the electrode, and discharge may be difficult to induce.

SUMMARY OF INVENTION

The present invention provides a technique advantageous in suppressing lowering of discharge inducing performance in an ionization gauge.

According to the first aspect of the present invention, there is provided an ionization gauge comprising an anode, a cathode, and an electromagnetic wave source, wherein the cathode comprises a first cathode plate including a through hole through which the anode passes, a storage portion configured to store the electromagnetic wave source, and a passage arranged between the storage portion and the through hole and configured to pass an electromagnetic wave generated by the electromagnetic wave source.

According to the second aspect of the present invention, there is provided a cartridge used in an ionization gauge including an anode, an electromagnetic wave source, and a container, the cartridge comprising a first cathode plate including a through hole through which the anode passes, a storage portion configured to store the electromagnetic wave source, and a passage arranged between the storage portion and the through hole and configured to pass an electromagnetic wave generated by the electromagnetic wave source.

Further features of the present invention will become apparent from the following description of exemplary embodiments with reference to the attached drawings.

DESCRIPTION OF EMBODIMENTS

Hereinafter, the embodiments will be described in detail with reference to the accompanying drawings. It should be noted that the following embodiments are not intended to limit the scope of the appended claims of the present invention. A plurality of features are described in the embodiments. However, not all of the plurality of features are necessarily essential to the present invention, and the plurality of features may arbitrarily be combined. Also, the same reference numerals denote the same or similar parts throughout the accompanying drawings, and a repetitive description thereof will be omitted.

Figure 1:
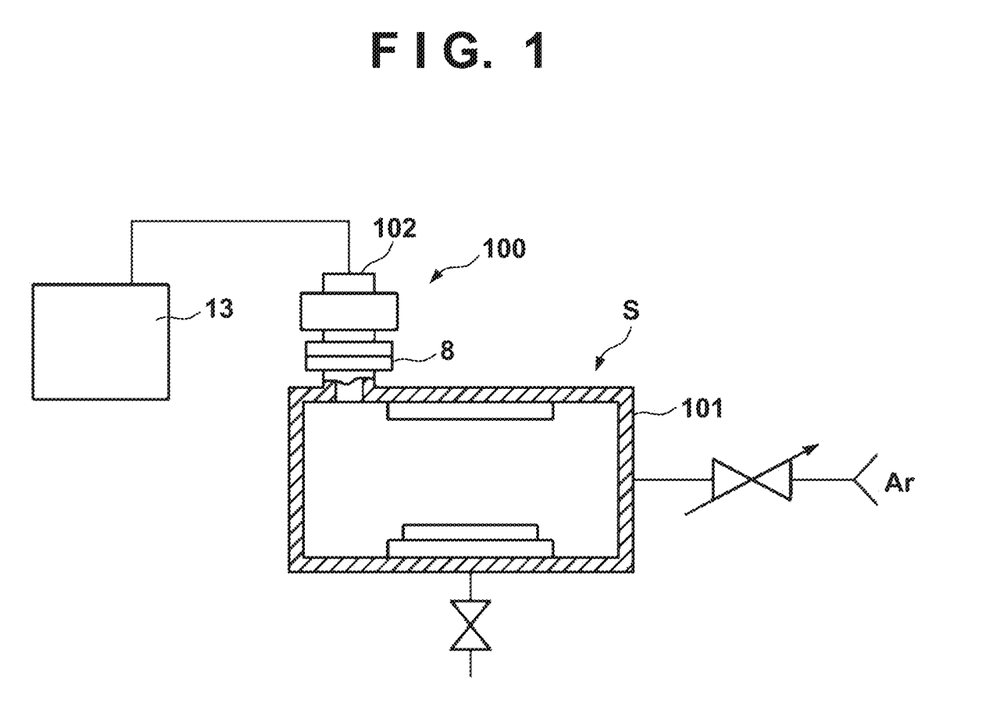
FIG. 1 is a view showing a vacuum processing apparatus according to an embodiment and an ionization gauge attached to it.

FIG. 1 shows a vacuum processing apparatus S according to an embodiment and an ionization gauge 100 attached to it. The vacuum processing apparatus S can be, for example, a deposition apparatus. Examples of the deposition apparatus are a sputtering apparatus, a PVD apparatus, and a CVD apparatus. The vacuum processing apparatus S may be a surface treatment processing such as an ashing apparatus or a dry etching apparatus.

The ionization gauge 100 can include a probe 102, and a control unit 13 connected to the probe 102. The vacuum processing apparatus S includes a vacuum container 101, and can process a processing target object such as a substrate in the vacuum container 101. The probe 102 is attached to an opening portion provided in the wall of the vacuum container 101 while holding airtightness. In an example, the probe 102 can be connected via a flange 8 of the vacuum container 101. The control unit 13 and the probe 102 may be configured to be separable from each other or may be integrated.

Figure 2:
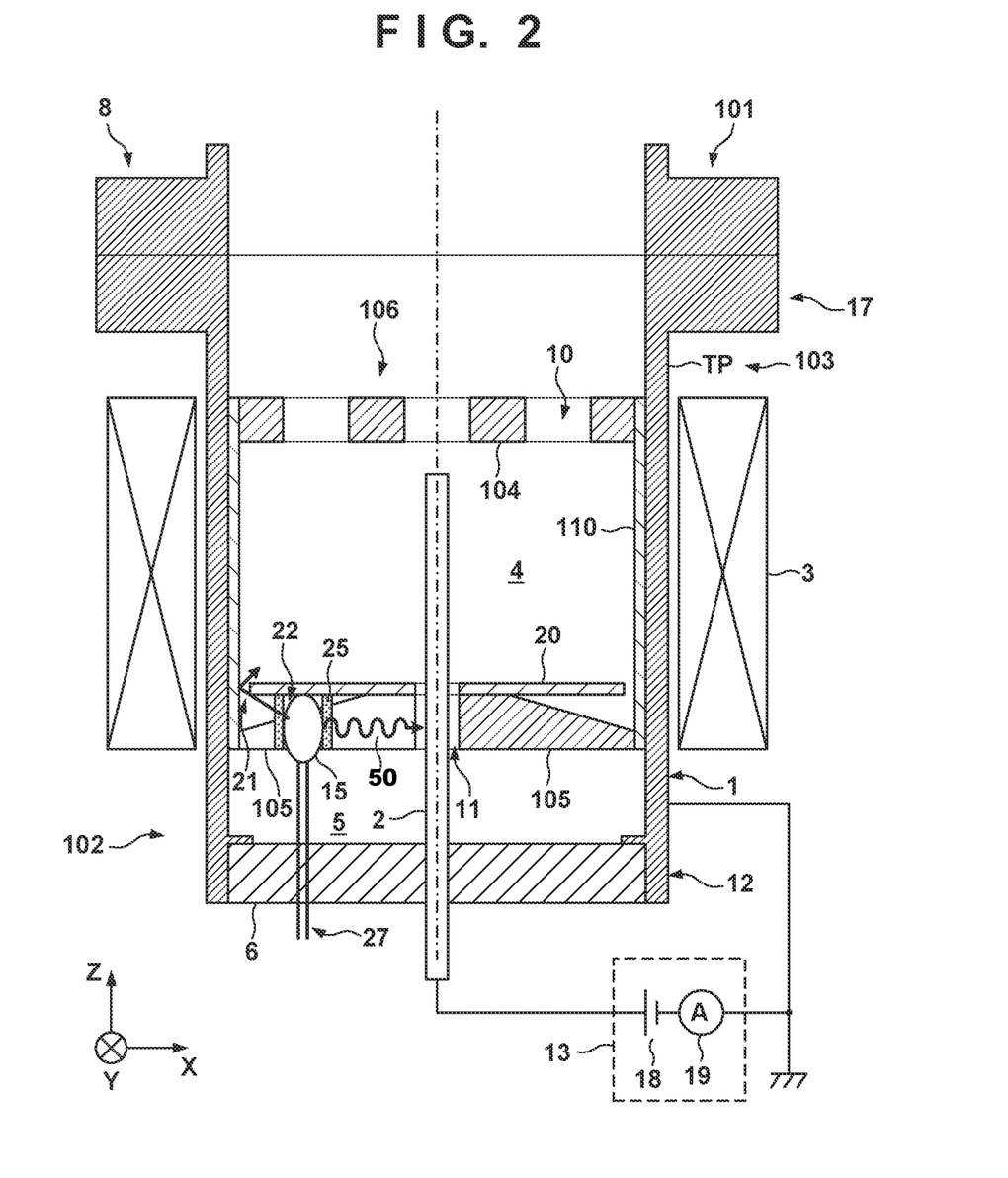
FIG. 2 is a view showing the arrangement of an ionization gauge according to the first embodiment.

FIG. 2 shows the arrangement of an ionization gauge 100 according to the first embodiment. The ionization gauge 100 can be configured as, for example, a reverse magnetron type gauge, but is not limited to this. A probe 102 can include a container 103 that forms a cathode 1, and an anode 2. The container 103 that forms the cathode 1 can include a tubular portion TP having, for example, a tubular shape such as a cylindrical shape. The anode 2 can have a rod shape. The cathode 1 can be arranged to surround the rod-shaped anode 2. A discharge space 4 can be defined by the anode 2 and the cathode 1. The container 103 can be made of a conductor such as a metal (for example, stainless steel). The anode 2 can be made of a conductor such as a metal (for example, molybdenum, tungsten, nickel, or titanium). The probe 102 can further include a magnet 3 that forms a magnetic field. The magnet 3 can be arranged to surround the tubular portion TP, and can have a ring shape. The magnet 3 can be, for example, a permanent magnet such as a ferrite magnet. One end (the side of the vacuum container 101) of the tubular portion TP of the container 103 can be opened, and the other end of the tubular portion TP can be sealed by an insulating sealing member 6. In an example, the anode 2 can be arranged to extend through the sealing member 6. The sealing member 6 can be made of, for example, alumina ceramic.

An exchangeable cartridge 106 may be arranged in the container 103. The cartridge 106 can be a consumable component usable in the ionization gauge 100. The cartridge 106 can be, for example, a cathode structure. The cartridge 106 can include pole pieces (cathode plates) 104 and 105, and an inner tube 110. The pole pieces 104 and 105 can have a function of adjusting a magnetic field, and a function of surrounding the discharge space 4. The inner tube 110 can include an outer surface that is in contact with the inner surface of the container 103, and an inner surface surrounding the discharge space 4, and can support the pole pieces 104 and 105. The pole pieces 104 and 105 and the inner tube 110 can be made of a conductor such as a metal. The conductor that can form the pole pieces 104 and 105 may be a magnetic material (for example, stainless steel having magnetism), or may be a nonmagnetic material (for example, stainless steel that has no magnetism).

The cartridge 106 is electrically connected to the tubular portion TP, and the pole pieces 104 and 105 and the inner tube 110 can form a part of the cathode 1. If the cartridge 106 has degraded due to collision of ions or the like against the cartridge 106, the degraded cartridge 106 is exchanged with a new cartridge 106, thereby recovering the function of the ionization gauge 100. In this example, the cartridge 106 is exchangeable. However, the cartridge 106 may be inseparably coupled with the tubular portion TP.

The pole piece (first cathode plate) 105 can include a through hole 11 through which the anode 2 extends, and a storage portion 22 that stores an electromagnetic wave source 15. The through hole 11 is provided not to electrically connect the pole piece 105 and the anode 2, that is, to form a gap between the pole piece 105 and the anode 2. The electromagnetic wave source 15 can be, for example, a light source. The pole piece 105 is provided with a cover 25 that covers the electromagnetic wave source 15. When the cartridge 106 is detached from the tubular portion TP, the cover 25 can be detached from the tubular portion TP together with the pole piece 105. In this case, the cover 25 can be exchanged by exchanging the cartridge 106. The cover 25 can be made of a material (for example, silica) that passes an electromagnetic wave radiated from the electromagnetic wave source 15. The cover 25 prevents particles generated by sputtering the cathode 1 (mainly the cartridge 106) facing the discharge space 4 from being deposited on the electromagnetic wave source 15. The cover 25 can have, for example, a cylindrical shape.

The pole piece (second cathode plate) 104 is arranged apart from the pole piece 105, and the discharge space 4 can be defined between the pole piece 105 and the pole piece 104. The pole piece 105 can be arranged between the pole piece 104 and the sealing member 6. The pole piece 105 can be arranged at an end of the inner tube 110 (an end on the side of the sealing member 6). The pole piece 104 can be arranged at the other end of the inner tube 110 (an end on the open end of the tubular portion TP). The pole piece 104 includes one or a plurality of through holes 10, and the vacuum container 101 and the discharge space 4 communicate via the one or the plurality of through holes 10.

The cartridge 106 or the cathode 1 can further include a cathode plate (third cathode plate) 20 between the pole piece 105 (first cathode plate) and the pole piece 104 (second cathode plate). The cathode plate 20 can be arranged to be in contact with the pole piece 105. The cathode plate 20 includes a through hole to pass the anode 2. The cathode plate 20 can be configured to transmit the electromagnetic wave generated by the electromagnetic wave source 15 to the discharge space 4 surrounded by the pole piece 104, the cathode plate 20, and the inner tube 110 (tubular portion TP). For example, the cathode plate 20 can be configured to form a gap 21 between the cathode plate 20 and the inner tube 110 and transmit, via the gap 21, the electromagnetic wave generated by the electromagnetic wave source 15 to the discharge space 4. Not only the electromagnetic wave generated by the electromagnetic wave source 15 but also electrons generated by the photoelectric effect upon irradiating a portion between the cathode plate 20 and the pole piece 105 in the inner tube 110 with the electromagnetic wave can be supplied to the discharge space 4 via the gap 21. The inner tube 110 can be made of the same material as the pole pieces 105 and 104.

The anode 2 is electrically connected to the control unit 13. The control unit 13 can include a power supply 18 configured to apply a voltage to the anode 2, and a current detection unit 19 configured to measure a discharge current flowing between the anode 2 and the cathode 1. The discharge current detected by the current detection unit 19 has a correlation with the pressure in the discharge space 4, and the pressure can be calculated by a processor (not shown) based on the correlation. The pressure in the vacuum container 101 can thus be detected.

Figure 3A:
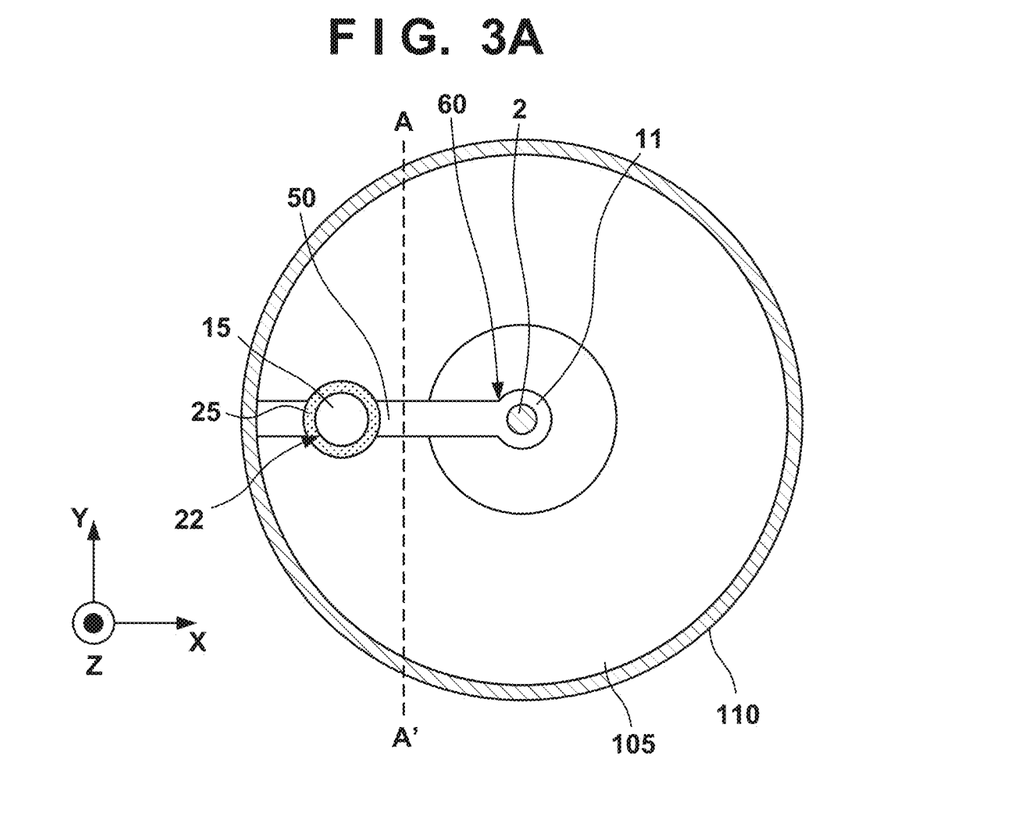
FIG. 3A is a view showing the arrangement of the ionization gauge according to the first embodiment.
Figure 3B:
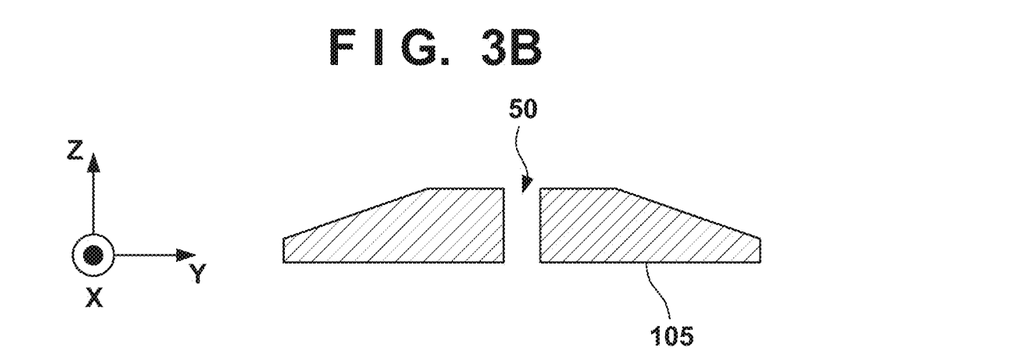
FIG. 3B is a view showing the arrangement of the ionization gauge according to the first embodiment.

FIG. 3A is a plan view of the pole piece 105 shown in FIG. 2, which is viewed from the + direction of the z-axis in FIG. 2. Note that in FIG. 3A, the cathode plate 20 is not illustrated. FIG. 3B is a sectional view of the pole piece 105 taken along a line A-A' in FIG. 3A. As shown in FIGS. 2, 3A, and 3B, the pole piece (first cathode plate) 105 can include, between the storage portion 22 and the through hole 11, a passage 50 configured to pass the electromagnetic wave generated by the electromagnetic wave source 15. The passage 50 can be provided to form a linear path between the electromagnetic wave source 15 and the through hole 11. The passage 50 can extend in a radial direction to connect the storage portion 22 and the through hole 11. The passage 50 can be provided to face a space 5 surrounded by the pole piece 105, the sealing member 6, and the tubular portion TP. When the passage 50 is provided in the pole piece 105, the electromagnetic wave generated by the electromagnetic wave source 15 irradiates the surface of the through hole 11 via the passage 50, and generates electrons on the surface of the through hole 11 by the photoelectric effect. The electromagnetic wave generated by the electromagnetic wave source 15 can directly irradiate the surface of the through hole 11, and can also be reflected by the surface of the passage 50 and/or the anode 2 and then irradiate the surface of the through hole 11. A part of the electromagnetic wave generated by the electromagnetic wave source 15 can generate electrons on the surface of the passage 50 by the photoelectric effect. The electrons generated on the surface of the through hole 11 and the surface of the passage 50 can be supplied to the discharge space 4. In addition, the inter-electrode distance (the distance between the pole piece 105 and the anode 2) in the through hole 11 is relatively shorter than the inter-electrode distance in another space in the ionization gauge 100. Hence, the electric field in the through hole 11 is relatively large. For this reason, the electric field efficiently concentrates in a bending portion (projection) 60 formed at the boundary between the passage 50 and the through hole 11, and electrons can be generated by field emission from the bending portion (projection) 60. From the above, when the passage 50 is provided, the amount of electrons emitted to the discharge space 4 can be increased, and as a result, discharge inducing performance can be improved.

The electromagnetic wave source 15 can generate an electromagnetic wave, for example, soft x-rays. The storage portion 22 that stores the electromagnetic wave source 15 can be, for example, a through hole or a concave portion provided in the pole piece 105. The storage portion 22 may be in contact with the electromagnetic wave source 15 or not. The storage portion 22 may hold the electromagnetic wave source 15 or not. In an example, the distance between the storage portion 22 and the inner tube 110 may be shorter than the distance between the storage portion 22 and the anode 2. In another viewpoint, the distance between the electromagnetic wave source 15 and the inner tube 110 may be shorter than the distance between the electromagnetic wave source 15 and the anode 2. This arrangement can reduce the attenuation of the electromagnetic wave that is generated by the electromagnetic wave source 15 and enters the inner tube 110. This is advantageous in increasing the electrons emitted from the inner tube 110 to the discharge space 4 by the photoelectric effect.

The cathode plate 20 can be arranged between the electromagnetic wave source 15 and the discharge space 4. The cathode plate 20 can prevent particles generated by sputtering the cathode 1 (mainly the cartridge 106) facing the discharge space 4 from being deposited on the electromagnetic wave source 15. In an example, a surface of the pole piece 105 on the side of the discharge space 4 can include a portion that tilts to provide the electromagnetic wave radiated from the electromagnetic wave source 15 to the inner tube 110 and/or the gap 21. Power supply to the electromagnetic wave source 15 can be done by a power cable 27. The power cable 27 can be extracted to the outside of the container 103 via the sealing member 6. The arrangement for extracting the power cable 27 and the anode 2 to the outside via the sealing member 6 common to these is advantageous in simplifying the structure of the ionization gauge 100.

At least one of the electromagnetic wave source 15 and the cover 25 may be coated with a film made of a material of a low work function, for example, a metal. If the electromagnetic wave enters the material of the low work function, electrons are efficiently generated. Hence, when at least one of the electromagnetic wave source 15 and the cover 25 is coated with the film made of the material of the low work function, electrons can efficiently be generated. In addition, the inner surface of the inner tube 110 may be coated with a material whose work function is lower than that of the base material of the inner tube 110.

Figure 4A:
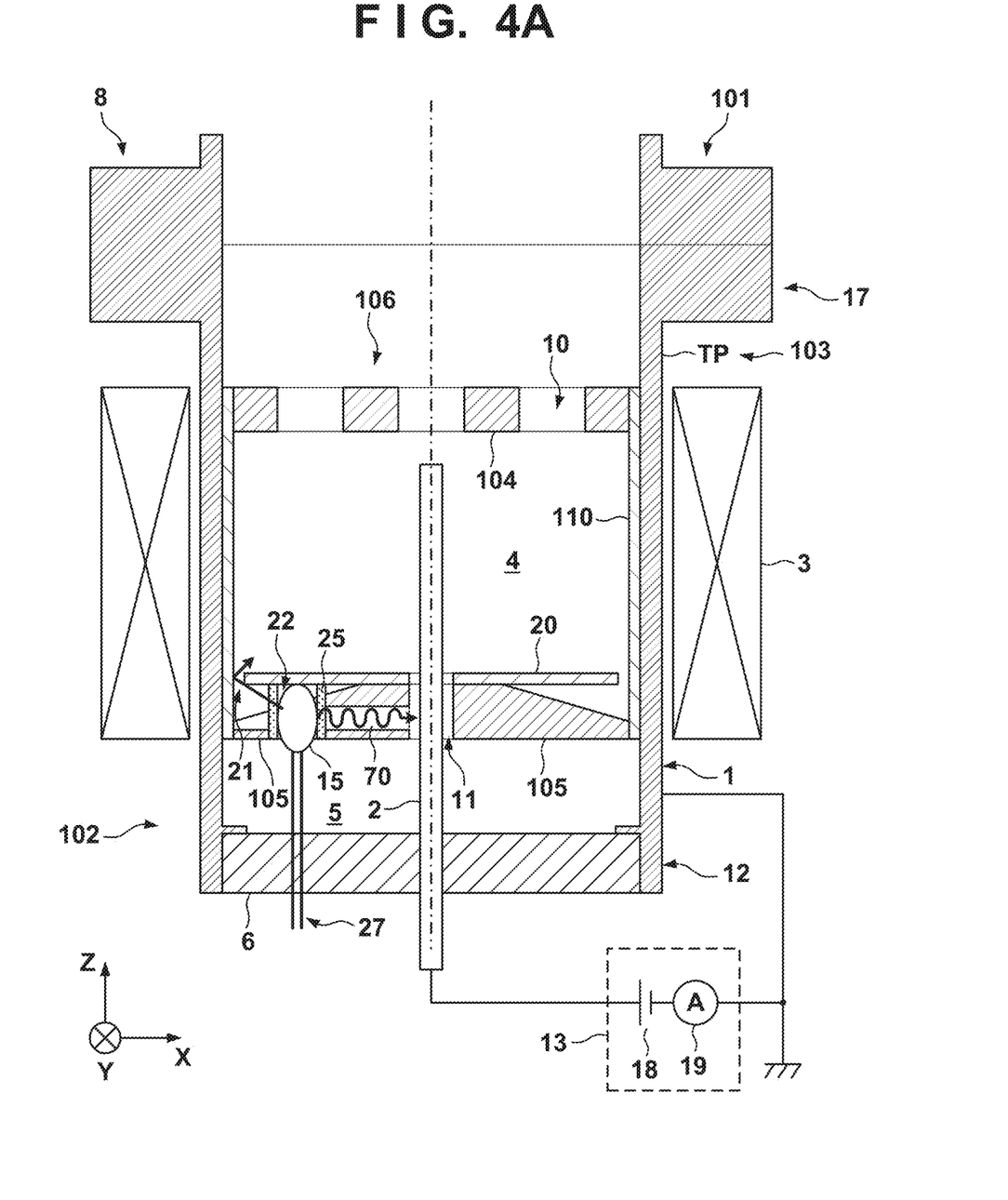
FIG. 4A is a view showing the arrangement of an ionization gauge according to the second embodiment.
Figure 5A:
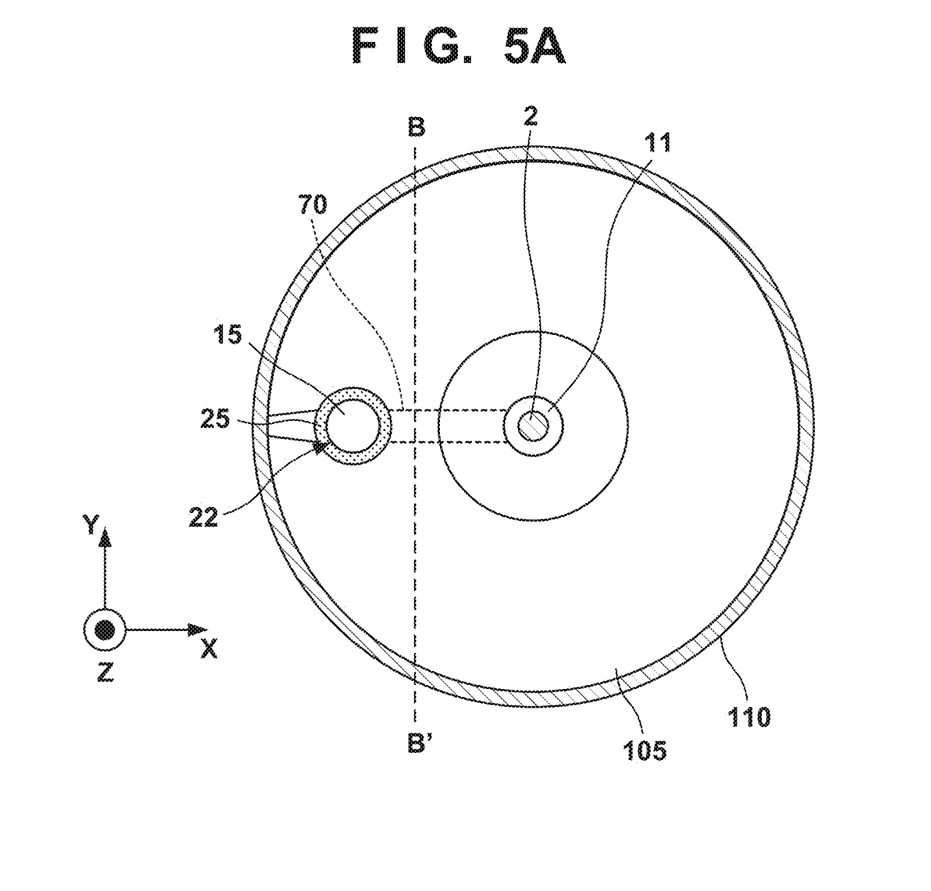
FIG. 5A is a view showing the arrangement of the ionization gauge according to the second embodiment.
Figure 5B:
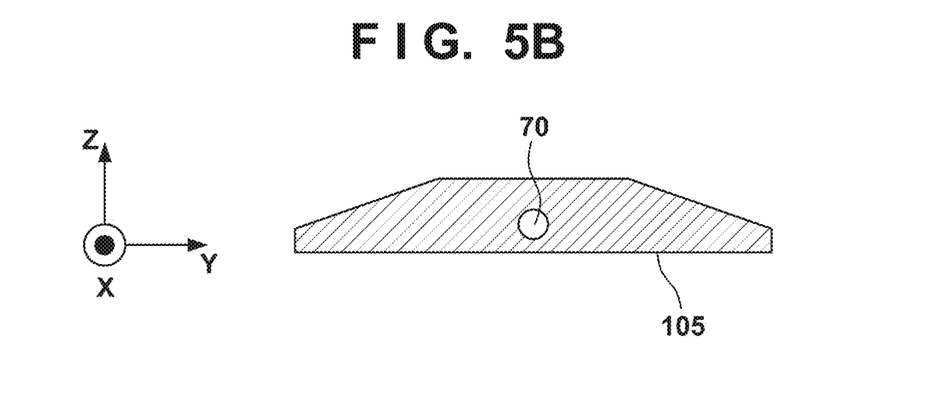
FIG. 5B is a view showing the arrangement of the ionization gauge according to the second embodiment.

FIGS. 4A, 5A, and 5B show the arrangement of an ionization gauge 100 according to the second embodiment. Here, FIG. 5A is a plan view of a pole piece 105 shown in FIG. 4A, which is viewed from the + direction of the z-axis in FIG. 4A. Note that in FIG. 5A, a cathode plate 20 is not illustrated. FIG. 5B is a sectional view of the pole piece 105 taken along a line B-B' in FIG. 5A. Matters that are not mentioned as the second embodiment can comply with the first embodiment.

As shown in FIGS. 4A, 5A, and 5B, the pole piece (first cathode plate) 105 can include, between a storage portion 22 and a through hole 11, a passage 70 configured to pass an electromagnetic wave generated by an electromagnetic wave source 15. The passage 70 can be a through hole that makes the storage portion 22 and the through hole 11 communicate. The passage 70 can be provided to form a linear path between the electromagnetic wave source 15 and the through hole 11. The passage 70 can extend in a radial direction to connect the storage portion 22 and the through hole 11. When the passage 70 is formed as a through hole, the electromagnetic wave radiated from the electromagnetic wave source 15 can be confined in the passage 70, and the electromagnetic wave can therefore more efficiently reach the surface of the through hole 11. The passage 70 may include a portion extending between the storage portion 22 and an inner tube 110.

Figure 4B:
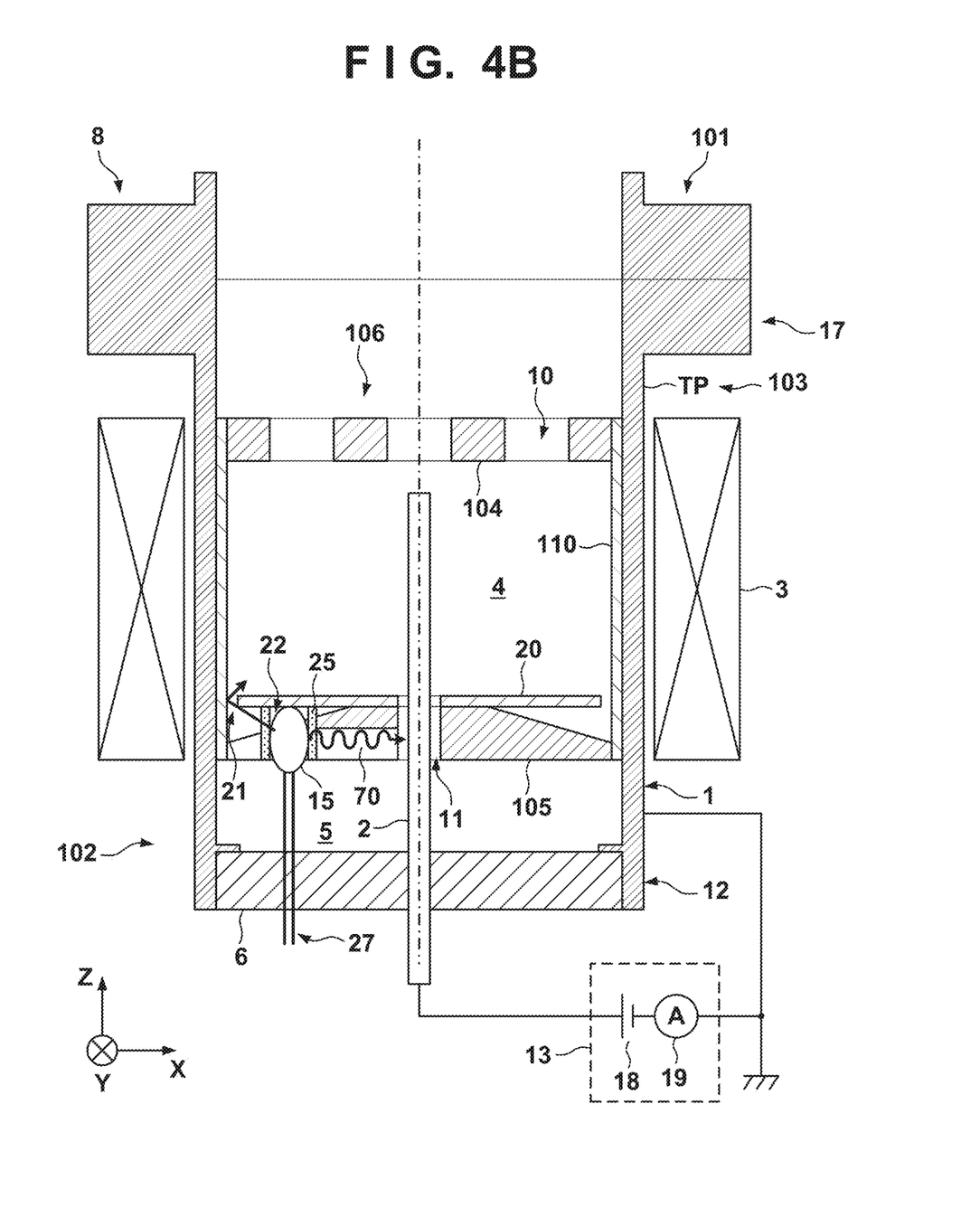
FIG. 4B is a view showing the arrangement of a modification of the ionization gauge according to the second embodiment.
Figure 5C:
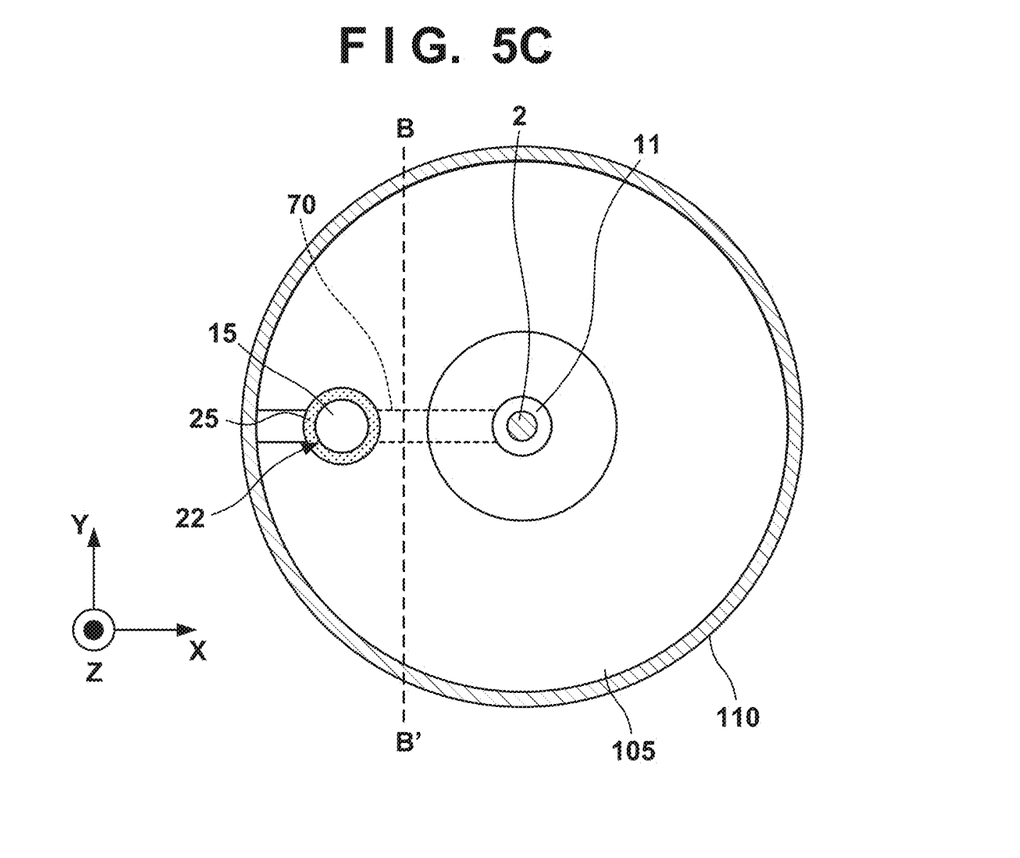
FIG. 5C is a view showing the arrangement of the modification of the ionization gauge according to the second embodiment.
Figure 5D:
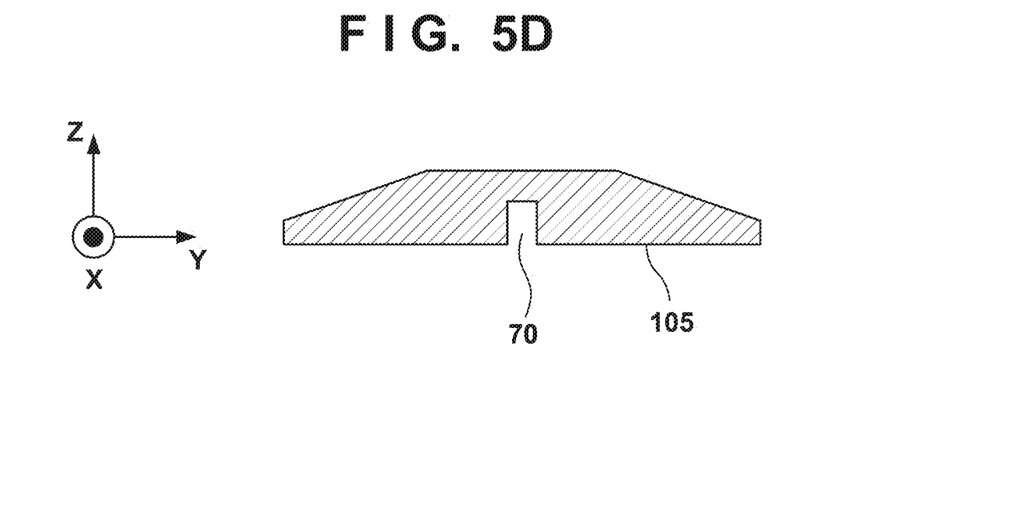
FIG. 5D is a view showing the arrangement of the modification of the ionization gauge according to the second embodiment.

FIGS. 4B, 5C, and 5D show the arrangement of a modification of the ionization gauge 100 according to the second embodiment. Here, FIG. 5C is a plan view of the pole piece 105 shown in FIG. 4B, which is viewed from the + direction of the z-axis in FIG. 4B. Note that in FIG. 5C, the cathode plate 20 is not illustrated. FIG. 5D is a sectional view of the pole piece 105 taken along a line B-B' in FIG. 5C. In the modification, the passage 70 is formed as a groove or a slit exposed to a space 5. This arrangement is excellent because machining is easy. The passage 70 may include a portion extending between the storage portion 22 and the inner tube 110.

Figure 6:
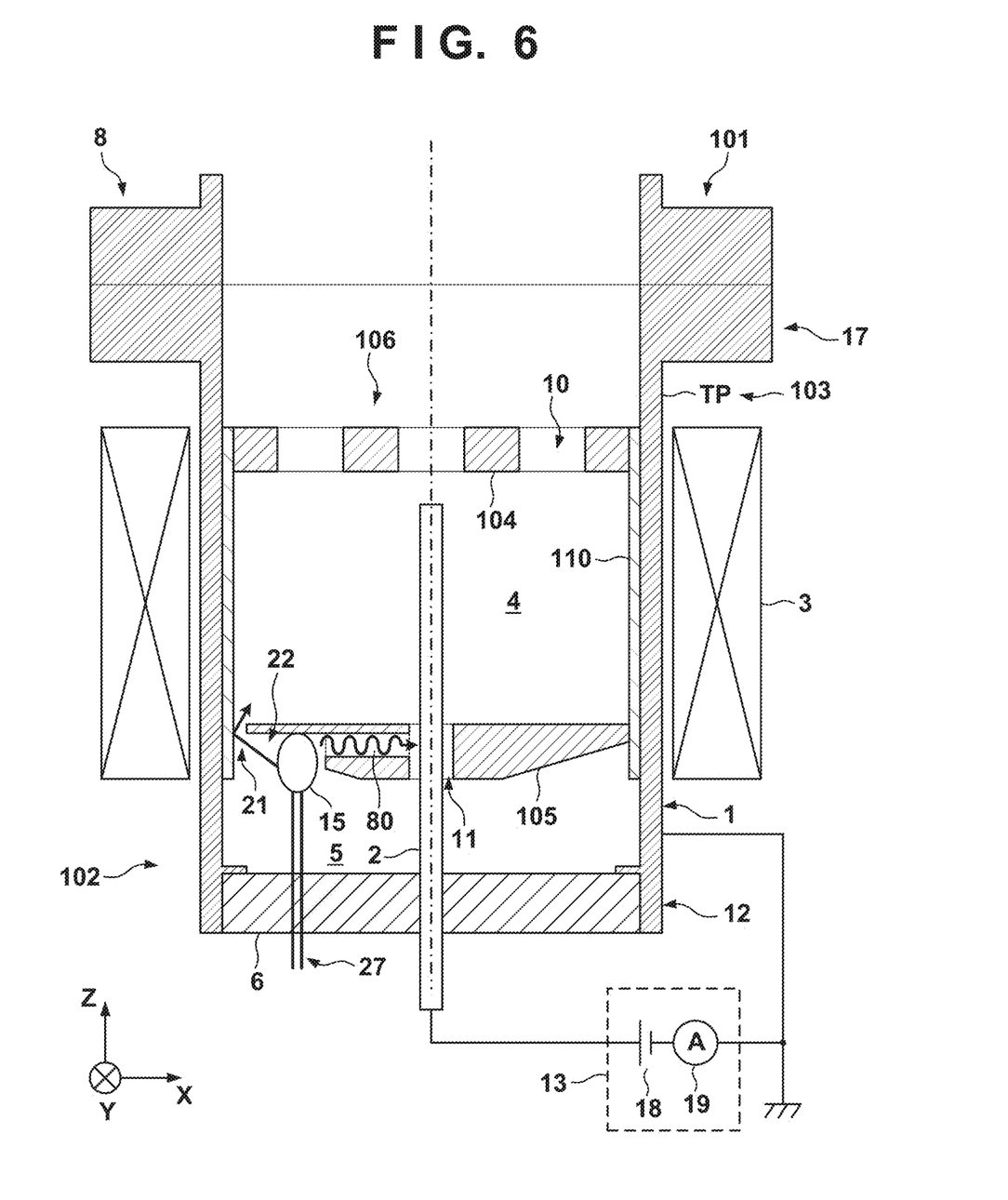
FIG. 6 is a view showing the arrangement of an ionization gauge according to the third embodiment.
Figure 7A:
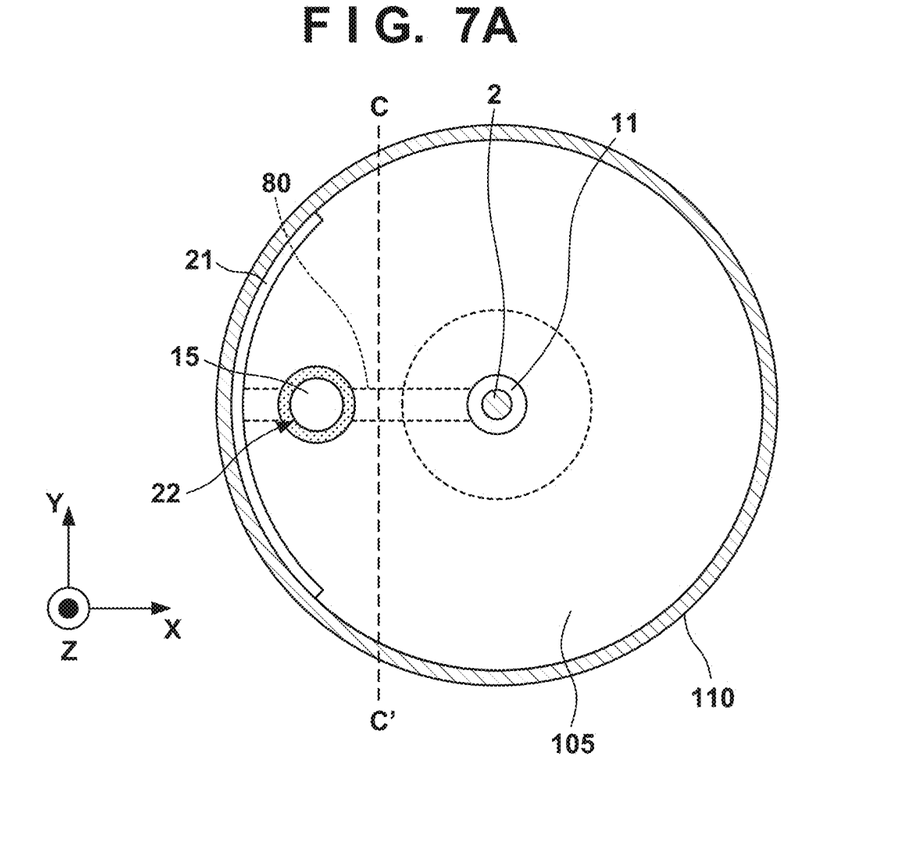
FIG. 7A is a view showing the arrangement of the ionization gauge according to the third embodiment.
Figure 7B:
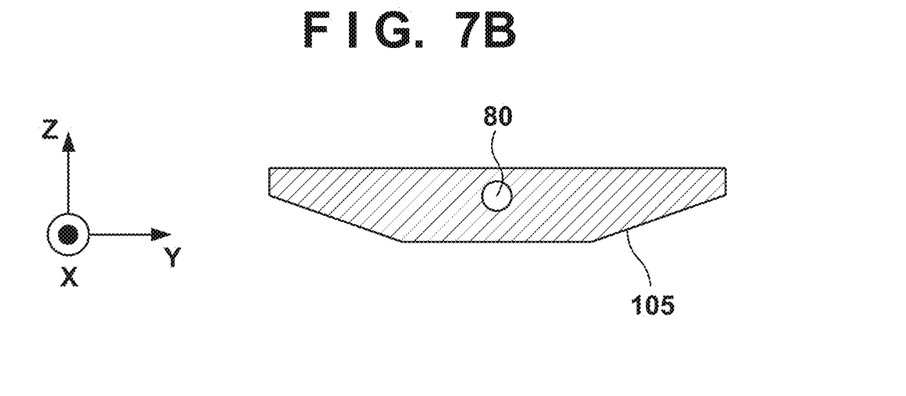
FIG. 7B is a view showing the arrangement of the ionization gauge according to the third embodiment.

FIGS. 6, 7A, and 7B show the arrangement of an ionization gauge 100 according to the third embodiment. Here, FIG. 7A is a plan view of a pole piece 105 shown in FIG. 6, which is viewed from the + direction of the z-axis in FIG. 6. FIG. 7B is a sectional view of the pole piece 105 taken along a line C-C' in FIG. 7A. Matters that are not mentioned as the third embodiment can comply with the first or second embodiment.

As shown in FIGS. 6, 7A, and 7B, the pole piece (first cathode plate) 105 can include, between a storage portion 22 and a through hole 11, a passage 80 configured to pass an electromagnetic wave generated by an electromagnetic wave source 15. The passage 80 can be provided to face a space 5 surrounded by the pole piece 105, a sealing member 6, and a tubular portion TP. The passage 80 may be a through hole that makes the storage portion 22 and the through hole 11 communicate. The passage 80 can be provided to form a linear path between the electromagnetic wave source 15 and the through hole 11. The passage 80 can extend in a radial direction to connect the storage portion 22 and the through hole 11. The electromagnetic wave radiated from the electromagnetic wave source 15 can move in the passage 80 while being reflected and reach the surface of the through hole 11. A surface of the pole piece 105 on the side of the space 5 can include a portion that tilts to provide the electromagnetic wave radiated from the electromagnetic wave source 15 to an inner tube 110 and/or a gap 21.

The present invention is not limited to the above embodiments, and various changes and modifications can be made within the spirit and scope of the present invention. Therefore, to apprise the public of the scope of the present invention, the following claims are made.

What is claimed is:

1. An ionization gauge comprising an anode, a cathode, and an electromagnetic wave source, wherein
the cathode comprises a first cathode plate having a first surface and a second surface opposite to the first surface, the first cathode plate including a first through hole through which the anode passes, a storage portion configured to store the electromagnetic wave source, and a passage arranged between the storage portion and the first through hole and configured to pass an electromagnetic wave generated by the electromagnetic wave source,
wherein the passage includes a portion arranged between the first surface and the second surface such that the electromagnetic wave generated by the electromagnetic wave source passes through the portion of the passage to the first through hole.

2. The ionization gauge according to claim 1, wherein the cathode further includes a tubular portion configured to surround the anode and the first cathode plate, and a second cathode plate arranged in the tubular portion and including a second through hole, and
one end of the tubular portion is opened, the other end of the tubular portion is sealed by a sealing member, and the first cathode plate is arranged between the second cathode plate and the sealing member.

3. The ionization gauge according to claim 2, wherein the second surface and the passage face a space surrounded by the first cathode plate, the sealing member, and the tubular portion.

4. The ionization gauge according to claim 2, wherein the portion of the passage comprises a third through hole configured to make the storage portion and the first through hole communicate.

5. The ionization gauge according to claim 2, wherein the cathode further includes a third cathode plate between the first cathode plate and the second cathode plate, and
the third cathode plate is configured to transmit an electromagnetic wave generated by the electromagnetic wave source to a discharge space surrounded by the second cathode plate, the third cathode plate, and the tubular portion.

6. The ionization gauge according to claim 1, wherein the portion of the passage is provided to form a linear path between the electromagnetic wave source and the first through hole of the first cathode plate.

7. A cartridge used in an ionization gauge including an anode, an electromagnetic wave source, and a container, the cartridge comprising
a first cathode plate having a first surface and a second surface opposite to the first surface, the first cathode plate including a first through hole through which the anode passes, a storage portion configured to store the electromagnetic wave source, and a passage arranged between the storage portion and the first through hole and configured to pass an electromagnetic wave generated by the electromagnetic wave source,
wherein the passage includes a portion arranged between the first surface and the second surface such that the electromagnetic wave generated by the electromagnetic wave source passes through the portion of the passage to the first through hole.

8. The cartridge according to claim 7, further comprising a second cathode plate arranged apart from the first cathode plate and including a second through hole, and an inner tube arranged in the container to support the first cathode plate and the second cathode plate.

9. The cartridge according to claim 8, wherein one end of the container is opened, and the other end of the container is sealed by a sealing member, and
the second surface and the passage face a space between the first cathode plate and the sealing member.

10. The cartridge according to claim 8, wherein the portion of the passage comprises a third through hole configured to make the storage portion and the first through hole communicate.

11. The cartridge according to claim 8, further comprising a third cathode plate between the first cathode plate and the second cathode plate,
wherein the third cathode plate is configured to transmit an electromagnetic wave generated by the electromagnetic wave source to a space which is surrounded by the second cathode plate, the third cathode plate and the inner tube.

12. The cartridge according to claim 7, wherein the portion of the passage is provided to form a linear path between the electromagnetic wave source and the first through hole of the first cathode plate.

* * * * *